Jan. 8, 1946.  W. J. MILLER  2,392,399
APPARATUS FOR USE IN MANUFACTURING POTTERY WARE
Original Filed May 16, 1942  2 Sheets-Sheet 1

INVENTOR.
William J. Miller
BY
George J. Cruninger
ATTORNEY.

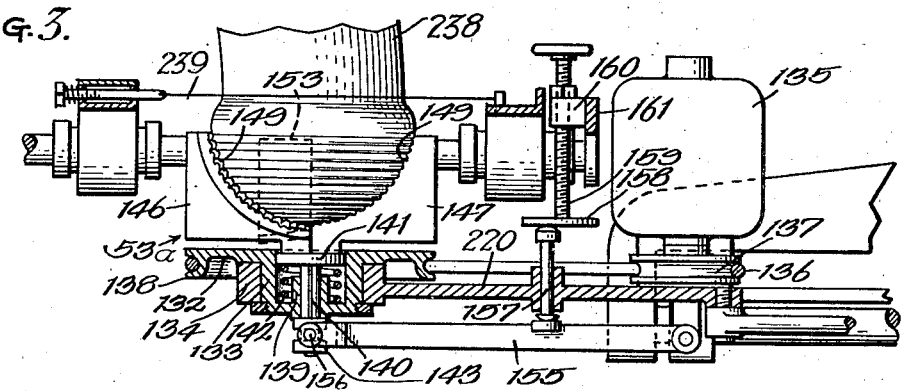

Patented Jan. 8, 1946

2,392,399

UNITED STATES PATENT OFFICE 2,392,399

APPARATUS FOR USE IN MANUFACTURING POTTERY WARE

William J. Miller, Swissvale, Pa., assignor to Miller Pottery Engineering Company, Swissvale, Pa., a corporation of Pennsylvania Original application May 16, 1942, Serial No. 443,226. Divided and this application June 13, 1944, Serial No. 540,059

20 Claims. (Cl. 25—22)

This is a division of my co-pending application Serial No. 443,226, filed May 16, 1942.

This invention relates to an apparatus for manufacturing pottery ware, particularly high-grade jiggered dinnerware and the like.

In making ware of this description, the dry ingredients are mixed with water, and after a process of refinement, are filter pressed for the purpose of removing excess liquid. The clay, at this stage, is plasticized, but is not of uniform consistency and in order to more thoroughly mix and homogenize the material, it is mascerated by the knives of a pug mill and then forced by an auger through an extrusion die or through a shredder and then through an extrusion die. Sometimes, the clay is shredded in a vacuum chamber in order to improve plasticity, homogeneity and workability. The extruded material is cut off in pugs containing sufficient material for several mold charges and, where the ware is being made by certain types of automatic machinery, these pugs are fed in endwise fashion to a cut-off wire which severs mold charges therefrom with periodic regularity and in timed relation with the presentation of molds at the feeding position, which receive the charges.

It is known that pugs of clay produced by the process described, which is more or less a standard process universally used in dinnerware potteries, are possessed of certain undesirable physical properties which have a detrimental effect on fabricating, drying and firing behavior of the clay and its glaze holding properties. Improvements in process and apparatus for preparing clay pugs have not succeeded in reducing these undesirable physical properties to any appreciable extent. The present invention has to do with apparatus for and a method of treatment of the pugged clay by means of which the aforesaid physical properties are eliminated altogether or reduced to harmless proportions.

There are several different kinds of undesirable physical properties and they differ in nature and origin. Pugs are seldom of uniform texture throughout due to variations in the consistency of the plastic material comprising the original filter cake, for instance, the perimetral zone of the cake is composed of clay harder in consistency than the core or center section which is usually soft. Macerating and mixing these two extremes together in a pug mill does not efficiently blend them and as a consequence the pug is said to have hard and soft spots or to be lumpy. When pressing a charge of clay out thin on the mold, the hard clay resists spreading and sometimes the pressure becomes great enough to crack the plaster mold. Also, in jiggering, the tool will tend to roughen the hard spots in spite of an abundance of lubricant and this spoils the surface of the ware. In drying, due to a variation in moisture content as between the harder or stiffer clay and the softer clay, the harder zones will dry faster than the softer zones and the resulting unequal shrinkage produces various defects prominent among which is warping.

I also believe that the treatment received by the clay while passing through the pug mill introduces internal stresses and strains which are not relieved, whilst the clay is in the plastic state and are responsible in part for the cracked and warped condition of some of the ware after drying or firing. Furthermore, the auger tends to laminate the clay in spiro-conical fashion and these laminations are pressed together again as the clay extrudes through the die so that the pug is actually composed of a number of layers of clay. I believe that later, during drying and firing, these laminations or vestiges thereof in the charge of clay are directly responsible for much of the cracked and warped ware.

I do not profess to know all about the exact nature and character of the various undesirable physical properties contained or the exact nature of the reactions which causes warping, cracking, etc., in a pug of clay, however, I have found that the novel method and apparatus herein disclosed has a beneficial effect on the clay which results in an appreciable reduction in losses from cracking and warping, both in the dried and fired stage, and is also accountable for smoother, more even display surfaces and a more homogeneous, finer textured body having superior glaze holding properties.

The clay spreads easier when applied to the mold and finishes off smoothly under the profile tool. Ripped backs, tool marks, rough spots are substantially eliminated and the production of merchantable ware from a given amount of clay is greatly increased due to the curtailment of losses heretofore thought unavoidable and accepted by the potter as inevitable. Furthermore, finishing costs and losses are greatly reduced because of the excellent condition of the display surface of the ware, when dried.

According to my method, the pug of clay with its undesirable physical properties is severed across the long axis to produce individual mold charges, but before the clay charge is fabricated and if desired, while still a part of the clay pug, it receives conditioning treatment which consists in puddling the same, an operation which kneads or works the clay and thereby breaks up laminations and relieves internal strains followed by a troweling operation or a smoothing and polishing of the surface of the previously puddled zone which makes for a satiny, smooth display surface devoid of pin holes. This later operation is performed by blade type spreaders with or without actual shaping of the clay to fit the molding surface. I prefer to puddle and trowel the surface of the clay which goes against the molding surface, (which is a distinguishing feature over the method taught in my co-pending application, S. N. 320,007), and then by a subsequent troweling operation puddle and trowel the opposite side of the blank, preferably after the blank has been applied to the mold.

I also wish it understood that the charge of clay may be troweled only, as by the use of spreader blades, in the interest of smoothing the clay to eliminate pinholes without departing from the spirit and scope of the invention.

The machine hereof, in which the novel features of my invention are demonstrated, comprises a turntable type, automatic feeder for use with apparatus for jiggering clay on molds. The invention comprehends the preparation of charges of clay for making hollow ware as well as flatware in similar or diversified shapes.

Other objects and advantages will become apparent by reference to the specification and the accompanying drawings, in which Figure 1 is a diagrammatic view in plan illustrating generally one form of adaptation of the invention to a rotary machine for producing diversified ware.

Figure 3 is an enlarged sectional detail of the puddling and troweling apparatus and showing the arrangement of the parts during the puddling operation.

Figure 4 is a view similar to Figure 3 but showing the arrangement of the parts during the troweling or polishing operation.

Figure 5 is a plan view of the combination puddling and troweling tools shown in Figure 4 with parts broken away to more clearly disclose the structure.

Figure 6 is an enlarged section of a puddling and troweling tool adapted for flatware charges such as plates or saucers, and showing the arrangement of the parts during the puddling operation.

Figure 7 is a section taken on the line 7—7 of Figure 6, but showing arrangement of the parts during the troweling operation.

Figure 1:
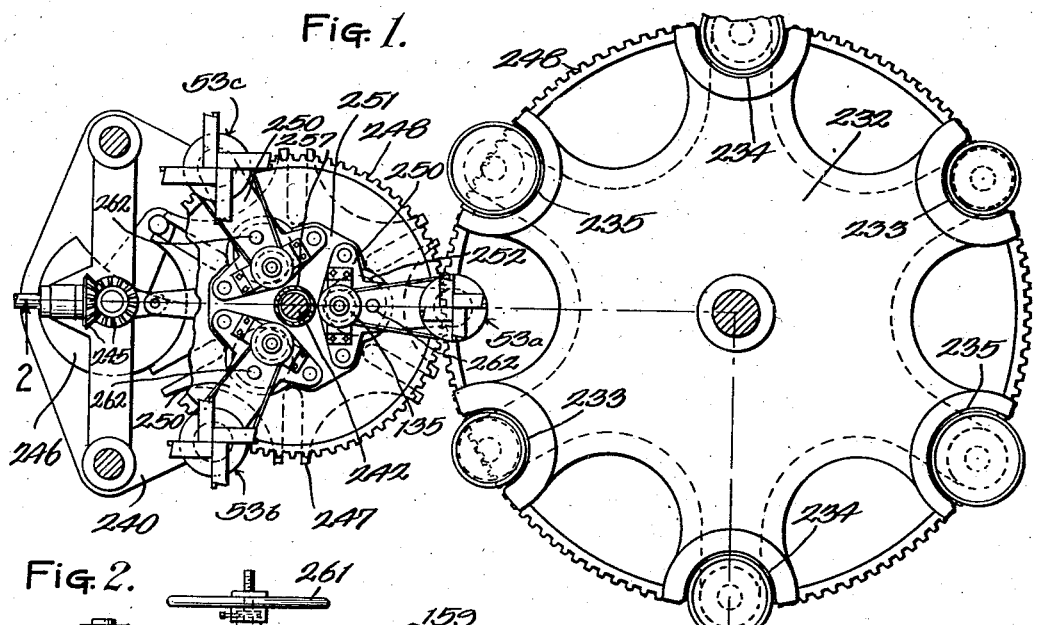
Figure 2:
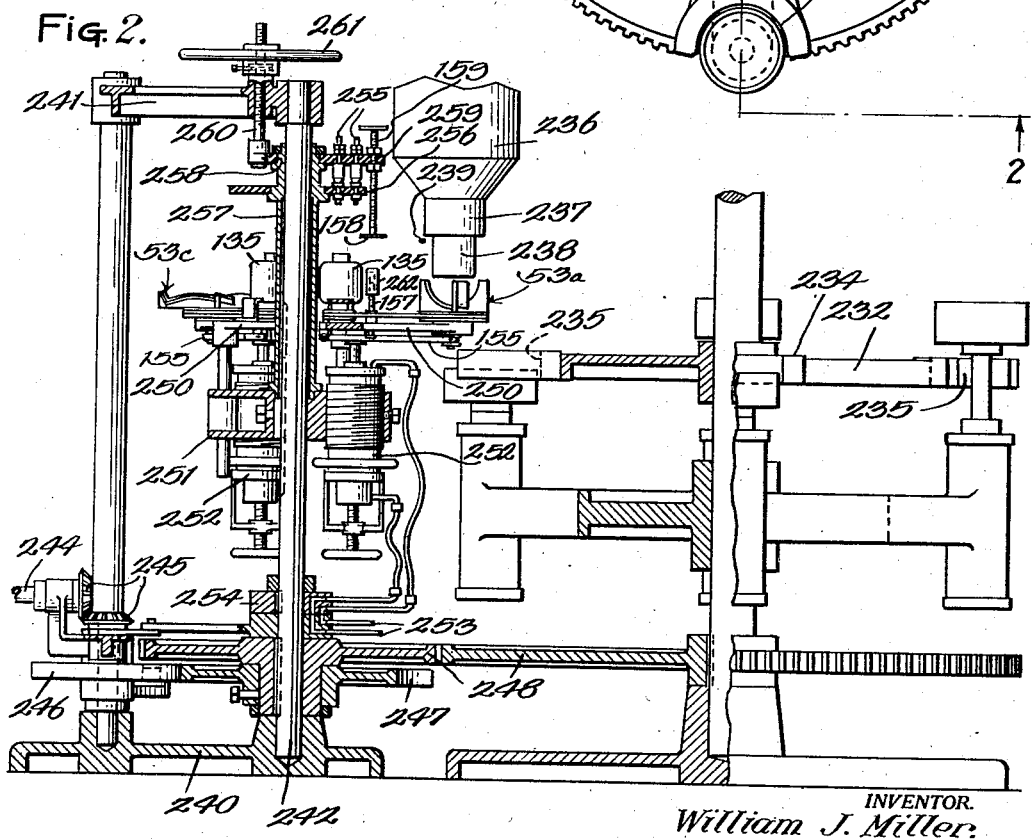
Figure 2 is a section view taken on the line 2—2 of Figure 1.

One style of rotary machine to which the invention may be adapted is diagrammatically shown, in Figures 1 and 2, as including a turret 232 having spaced thereabout two sets of mold seats 233, 234 and 235 for supporting molds for cups, saucers and plates respectively. The turret is intermittently rotated to advance molds in said seats centrally under a clay extrusion cylinder 236 from whose depending nozzle 237 the clay column 238 is extruded the proper length for each mold and cut off by a suitable cutter 239 and dropped into the molds for fabrication at various stations about the turret.

One form of the invention adapted for this machine may include a frame comprising a base 240 and a top frame member 241 supporting an upright intermittently rotated shaft 242 upon which are arranged thereabout three types 53a, 53b and 53c of wedge device adapted for the cup, saucer and plate charges, and into cooperative relation with which the devices are brought before the charges are cut. The shaft 242 is driven by a power shaft 244 through bevel gears 245 and a Geneva motion connection including a crank-and-lock disc 246 and a six-pointed star wheel 247, and is in driving connection with the turret through gearing 248 whereby the mold seats and devices will alternately register under the extrusion nozzle.

In this form, the motor 135, lever 155 and other parts associated therewith for operating each device 53a, 53b and 53c would be supported on a cross-head 250 mounted for vertical reciprocation on a turret 251 arranged on the shaft 242 for vertical adjustment and supporting a piston-and-cylinder motor 252 for reciprocating the cross-head to move the device into and out of engagement with the clay column. When each device is positioned under the clay column, its associated motor 252 is energized from air pressure lines 253 through a distributor 254 on the shaft 242 and its motor 135 is energized from electric contacts 255 through a distributor 256 carried on said shaft. The distributor 256 and turret 251 are secured to a sleeve 257 in sliding-key connection with the shaft 242 and being in swiveling connection, as at 258, at its top end, with a plate 259 having an upright screw 260 slidable in a bearing in the top frame member 241 with a handwheel 261 threaded thereon for adjusting the mean elevation of the devices simultaneously in accordance with various types of rotary machines. The plate 259 may support the electric contacts 255 and also support the stop 158 and adjusting screw 159, Figure 3, for successively cooperating with the pins 157 of the devices in retracting the wedging trowels.

The motors 252 are adjustable on the turret 251 to vary the upper limits of movement of the devices in accordance with the length of the charges upon which they operate, and the pins 157 may be provided with a sleeve 262 threaded on the top end thereof for adjusting initial contact with the stop 158 in accordance with the range and upper limit of movement of the devices.

The device 53a comprises a rotating base 132 in the form of a wheel having a hollow depending trunnion 133 rotatably mounted in a bearing 134 in the outer end of the crosshead 250. The base is rotated by an electric motor 135 on the crosshead by way of a belt 136 providing a driving connection between a sheave 137 on the motor shaft and a sheave formation 138 of the wheel (Figures 3 and 4). In the bottom wall of the trunnion 133 is a central bearing 139 within which is reciprocated, in keyed connection therewith, a depending stem 140 of a disc-like head 141 arranged in the trunnion and resiliently urged upward therein by a coiled spring 142 arranged therebelow in the trunnion. A collar 143 on the bottom end of the stem limits upward movement of the head 141 by engaging the central bearing 139.

Mounted on the central head 141 of the base 132 are two diametrically opposed puddling tools 146 and 147, each being arcuately shaped with its clay working edge 148 radiating from the axis of the head so that when rotated against the end of the clay slug upon upward movement thereof with the crosshead 250, said end will be spread to assume a surface contour generally corresponding with that of the mold surface for which the charge is intended (Figure 3). The said tools are also provided with clay puddling formations 149, such as comparatively small transverse alternate ridges and grooves or corrugations, with the ridges of one tool disposed in the path of the grooves of the other tool whereby they will produce a kneading or working of the subsurface clay. These corrugations may be so angularly disposed with respect to the working edges of the tools, as to produce an inward plowing effect on the clay, the clay being constantly turned over. However, the corrugations may be so arranged as to cause the clay to be turned over in an outward direction, or back and forth as desired depending on the consistency of the clay and the desired shape of the charge.

As the base 132 continues to advance, the tools 146 and 147 are caused to retract from the end of the slug whereby the depth of the plowing effect will be so gradually reduced as to cause a general smoothing out of the surface of the clay. Upon final upward movement of the base 132, the surface of the shaped and puddled clay is smoothed and polished by a pair of diametrically opposed blade-like tools, sometimes called trowels, 152 and 153 mounted on the base and arranged at right angles to the puddling tools, Figure 5. The tools 152 and 153 may be fixedly or removably mounted on the base with their working edges 154, radiating from the axis of the base. By so arranging the working edges of the tools, they will interfit in such a manner at the axis of the base whereby they will be effective at this point without interfering with each other, but it is preferred to make the tools continuous across the center to avoid leaving a mark or projecting test.

The central head 141 of the base 132 is depressed to retract the puddling tools 146—147 by a lever 155 on the crosshead 138 which has a swiveling connection, as at 156, with the collar 143, Figure 4, and actuated by a reciprocating pin 157 on the crosshead, as the pin engages a normally stationary stop 158 upon upward movement of the head. The stop 158 comprises a disc on the bottom end of a vertical adjustment screw 159 threaded in a bearing 160 of a bracket 161 of the feeder frame 50, whereby adjustment of extent of and initiation of withdrawal of the device can be made and to accommodate various settings of advance of the crosshead 250.

It is contemplated that in shaping the end of the clay pug for making hollow ware or cups in cavitous molds, the rounded bottom 134 of the fed charge (Figures 3 and 4) will have a slightly smaller arcuate contour than the arcuate contour of the molding surface of the mold, so that the surface of the charge will progressively engage the molding surface upwardly when spread thereover to prevent air entrapment. Likewise, for flat ware, the concavity of the charge will be flatter than the convexity of the mold and suitably contoured for the same purpose.

In the production of flat ware, such as plates and saucers, the charges may become further enlarged and may be contoured by the puddling and troweling tools. The puddling tools 218—219 (Figures 6 and 7) preferably flare and dish the pug end, as at 222, with a slight central bulge 223. Thus, when the charge is cut from the pug and dropped centrally on the mold, its central bulge first contacts the central mold surface, then progressively contacts and expels the air towards the mold brim.

I claim:

1. In combination, a rotatable support, a series of devices arranged about the axis of the support and mounted thereon for movement to raised and lowered positions, said devices having diversified retractable puddling tools respectively moved into operating position when the devices are partly raised and diversified clay smoothing tools respectively moved into operating position when the devices are fully raised, means to intermittently rotate the support, means for raising and lowering the devices when at a given station about the support, and means for retracting the puddling tools upon final upward movement of the devices at said station to render the smoothing tools operative.

2. Apparatus for puddling and smoothing the end of a pug of clay preparatory to slicing a charge of material therefrom comprising, an angularly movable support for carrying tools to a working position, a plurality of puddling and smoothing tools carried thereby to be successively moved into a position of register with the end of the pug of clay and means for moving said tools relative to the end of the pug when in register therewith to puddle and smooth the end thereof.

3. Apparatus for puddling and smoothing the end of a pug of clay preparatory to slicing a charge of material therefrom comprising, an angularly movable support for carrying tools to a working position, a plurality of puddling and smoothing tools carried thereby to be successively moved into a position of register with the end of the pug of clay, means for raising said tools into engagement with the end of the pug when in register therewith and means for revolving said tools when in engagement therewith to puddle and smooth the material.

4. Apparatus for puddling the end of a pug of clay preparatory to slicing a charge of material therefrom comprising, an angularly movable support for carrying tools to a working position, a plurality of puddling tools carried thereby to be successively moved into a position of register with the end of the pug of clay, and means for moving said tools relative to the end of the pug when in register therewith to puddle the end thereof.

5. Apparatus for smoothing the end of a pug of clay preparatory to slicing a charge of material therefrom comprising, an angularly movable support for carrying tools to a working position, a plurality of smoothing tools carried thereby to be successively moved into a position of register with the end of the pug of clay, and means for moving said tools relative to the end of the pug when in register therewith to smooth the end thereof.

6. Apparatus for puddling and smoothing the end of a pug of clay preparatory to slicing a charge of material therefrom comprising, an angularly movable support for carrying tools to a working position, a plurality of puddling and smoothing tools carried thereby to be successively moved into a position of register with the end of the pug of clay and means for moving first the puddling tools into engagement with the end of the pug of clay to puddle the same and then retracting the puddling tools and causing the smoothing tools to become effective upon the puddled surface.

7. Apparatus for puddling and smoothing the end of a pug of clay preparatory to slicing a charge of material therefrom comprising, an angularly movable support for carrying tools to a working position, a plurality of puddling and smoothing tools carried thereby to be successively moved into a position of register with the end of the pug, means for moving said tools relative to the end of the pug when in register therewith to puddle and smooth the material and means for enabling the support to be moved in an axial direction to various positions of adjustment.

8. Apparatus for puddling and smoothing the end of a pug of clay preparatory to slicing a charge of material therefrom comprising, a rotatable support for carrying tools to a working position, a plurality of puddling and smoothing tools carried thereby to be successively moved into a position of register with the end of the pug, means for moving said tools relative to the end of the pug when in register therewith to puddle and smooth the material, and means for adjusting the mean elevation of the support to vary the working level of the tools.

9. Apparatus for puddling and smoothing the end of a pug of clay preparatory to slicing a charge of material therefrom comprising, a rotatable support for carrying tools to a working position, a plurality of puddling and smoothing tools carried thereby to be successively moved into a position of register with the end of the pug, means for raising said support to cause the tools to engage the material to be operated upon, and means for revolving the tools when in engagement with the material to puddle and smooth the same.

10. Apparatus for puddling and smoothing the end of a pug of clay preparatory to slicing a charge of material therefrom comprising, a vertical shaft, a rotatable support for carrying tools to a working position mounted thereon, means for intermittently revolving said support, a plurality of puddling and smoothing tools carried by said support to be successively moved into and out of a position of register with the end of the pug, means for raising and lowering said support and means for revolving said tools when in register with the end of said pug to puddle and smooth the same.

11. The combination with mold indexing means provided with a plurality of stations, a support for a body of clay disposed adjacent one of said stations, a rotatable puddling tool, means for angularly moving said puddling tool into and out of register with said support in synchronism with the indexing means, and means for rotating the puddling tool to puddle the end of the mass of plastic material carried by said support.

12. The combination with mold indexing means provided with a plurality of stations, a support for a body of clay adjacent one of said stations, rotatable puddling and smoothing tools, means for angularly moving said puddling and smoothing tools into and out of register with the support in synchronism with the indexing means, and means for rotating the puddling and smoothing tools to puddle and smooth the body of clay carried by said support.

13. The combination with a mold indexing means provided with a plurality of stations, a tube disposed with its outlet end adjacent one of said stations, a rotatable puddling tool, means for angularly moving said puddling tool into and out of register with the end of said tube in synchronism with the indexing means and means for rotating the puddling tool to puddle the end of a pug of plastic material projecting from said tube.

14. The combination with mold indexing means provided with a plurality of stations, a tube disposed with its outlet end adjacent one of said stations, rotatable puddling and smoothing tools, means for angularly moving said tools into and out of register with the outlet end of said tube in synchronism with the indexing means, means for rotating the puddling and smoothing tools to puddle and smooth the end of a pug of plastic material projecting from said tube and means for raising and lowering said tools relative to the pug of material when in register therewith.

15. The combination with a mold indexing means provided with a plurality of stations, a support located adjacent one of said stations, a rotatable puddling tool, means for angularly moving said puddling tool into and out of register with the end of a pug of plastic material carried by said support in synchronism with the indexing means and means for segregating charges of material from the end of said pug.

16. The combination with mold indexing means provided with a plurality of stations, a support adjacent one of said stations, a rotatable smoothing tool, means for angularly moving said smoothing tool into and out of register with a pug of plastic material carried by said support in synchronism with the indexing means, means for rotating said smoothing tool to smooth the end of the pug of plastic material and means for segregating charges of clay from the end of the pug of material.

17. The combination with mold indexing means provided with a plurality of stations, a support adjacent one of said stations, rotatable puddling and smoothing tools, means for angularly moving said puddling and smoothing tools into and out of register with a pug of plastic material carried by said support in synchronism with the indexing means and means for segregating charges of clay from the end of said pug of plastic material.

18. The combination with rotatable mold indexing means provided with a plurality of stations, a tube disposed with its outlet adjacent one of said stations, a rotatable support, a plurality of puddling and smoothing tools carried by said support, means for angularly moving said support to move said puddling and smoothing tools into register with the end of said tube in synchronism with the indexing means, and means for rotating the puddling and smoothing tools to puddle the end of a pug of plastic material projecting from said tube.

19. The combination with mold indexing means provided with a plurality of stations, a tube disposed with its outlet end adjacent one of stations, a rotatable puddling tool, a motor for rotating said tool, means for angularly moving said puddling tool into and out of register with the end of said tube in synchronism with the indexing means, means for intermittently energizing said motor to rotate the puddling tool, and means for segregating charges of material from the end of a pug of plastic material projecting from said tube.

20. The combination with a rotatable mold support provided with a plurality of mold receiving members, a tube disposed with its outlet end adjacent said support, rotatable puddling tools, means for angularly moving said puddling tools into and out of register with the end of said tube in synchronism with the movement of the support, said puddling tools comprising implements for puddling charges for making hollow ware and implements for puddling charges for making flat ware, means for rotating said puddling tools when in register with the end of a pug of plastic material projecting from said tube and means for segregating charges of clay from the end of the pug of plastic material.

WILLIAM J. MILLER.